(12) United States Patent
Huff et al.

(10) Patent No.: US 7,131,401 B2
(45) Date of Patent: Nov. 7, 2006

(54) RETRACTING AND LOCKING LEASH ASSEMBLY

(75) Inventors: Scott Huff, Aurora, IL (US); Hugh Melling, Harbor Springs, MI (US)

(73) Assignee: Innovate, LLC, Harbor Springs, MI (US)

( * ) Notice: Subject to any disclaimer, the term of this patent is extended or adjusted under 35 U.S.C. 154(b) by 0 days.

(21) Appl. No.: 10/979,678

(22) Filed: Nov. 2, 2004

(65) Prior Publication Data
US 2005/0103282 A1    May 19, 2005

Related U.S. Application Data

(60) Provisional application No. 60/517,275, filed on Nov. 4, 2003.

(51) Int. Cl.
*A01K 27/00* (2006.01)

(52) U.S. Cl. ........................... 119/796; 119/794

(58) Field of Classification Search ............... 119/796, 119/794; 242/382, 384.7, 396.1, 385, 385.2, 242/385.4
See application file for complete search history.

(56) References Cited

U.S. PATENT DOCUMENTS

| | | | | |
|---|---|---|---|---|
| 2,314,504 A | * | 3/1943 | Lifchultz | 242/379.2 |
| 4,165,887 A | | 8/1979 | Bunn, Jr. | |
| 4,202,510 A | * | 5/1980 | Stanish | 242/384.7 |
| 4,269,150 A | * | 5/1981 | McCarthy | 119/796 |
| 4,501,230 A | * | 2/1985 | Talo | 119/796 |
| RE34,351 E | | 8/1993 | Lacey | |
| 5,494,002 A | | 2/1996 | Greene | |
| 5,857,261 A | * | 1/1999 | Li | 33/767 |
| 5,887,550 A | * | 3/1999 | Levine et al. | 119/796 |
| 5,983,836 A | | 11/1999 | Chavez | |
| 6,024,054 A | * | 2/2000 | Matt et al. | 119/796 |
| 6,247,427 B1 | | 6/2001 | DeBien | |
| 6,382,139 B1 | | 5/2002 | Rhodes | |
| 6,405,683 B1 | * | 6/2002 | Walter et al. | 119/772 |
| 6,619,239 B1 | * | 9/2003 | Benson et al. | 119/796 |
| 6,694,922 B1 | * | 2/2004 | Walter et al. | 119/772 |
| 2003/0029388 A1 | | 2/2003 | Walter et al. | |
| 2003/0145804 A1 | | 8/2003 | Vaccari | |

* cited by examiner

*Primary Examiner*—Teri Pham Luu
*Assistant Examiner*—Kimberly S. Smith
(74) *Attorney, Agent, or Firm*—Howard & Howard Attorneys, P.C.

(57) ABSTRACT

A retracting and locking leash housing includes a casing (30) and a handle (28). A pair of connectors (32) space the casing (30) from the handle (28) and define a finger (34) opening. A trigger (38) includes a gripping portion (48) and a locking portion (46) and is slidably supported for rectilinear movement. The gripping portion (48) and the locking portion (46) are connected by arms (50), which are coextensive with the connectors (32) about the finger (34) opening. A spool (36) is rotatably disposed in the casing (30) and includes a circle of teeth (58) and a finger (34) extends from the locking portion (46) to engage the circle of teeth (58) when the trigger (38) is moved rectilinearly to a locking position to prevent rotation of the spool (36).

19 Claims, 2 Drawing Sheets

RETRACTING AND LOCKING LEASH ASSEMBLY

CROSS REFERENCE TO RELATED APPLICATION

This application claims the benefit of provisional application Ser. No. 60/517,275 filed Nov. 4, 2003.

BACKGROUND OF THE INVENTION

1. Field of the Invention

A retracting and locking leash assembly of the type used to leash animals, e.g., for walking a dog.

2. Description of the Prior Art

When walking a pet on a leash, it is necessary to control how far the pet can wander from the leash holder. In order to do this, various retractable leashes have been developed to unwind and wind the leash from a housing. Typically, the housing defines a cavity casing and a handle spaced from the cavity casing by connectors surrounding and defining a finger opening. A spool is supported in the cavity casing for rotation about a winding axis and a leash is wrapped about the spool for winding on and unwinding from the spool in response to rotation of the spool. Various embodiments of such an assembly are shown in U.S. Pat. Nos. 6,405,683 and 6,694,922 and Application Publication 2003/0029,388, all in the name of Walter et al. These assemblies all include a trigger pivotally supported for controlling rotation of the spool. Such triggers present a control or finger engaging portion that is accessible by only one finger when a larger gripping area is needed for some operators.

Other assemblies have used a trigger slidably supported by the housing for rectilinear movement between a locked position to prevent rotation of the spool and an unlocked position to allow rotation of the spool to wind and unwind the leash to provide a more compact housing, as illustrated in U.S. Pat. No. 4,202,510 to Stanish. This arrangement, however, does not include a handle for gripping by the whole hand, which is often need for adequate leverage.

SUMMARY OF THE INVENTION AND ADVANTAGES

The invention, therefore, provides a trigger having a locking portion disposed in the cavity casing for engaging the spool and a gripping portion extending from the handle into the finger opening for moving the trigger rectilinearly.

Accordingly, the trigger is accessible in the handle opening for gripping with multiple fingers thereby providing for compact components and the requisite leverage.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
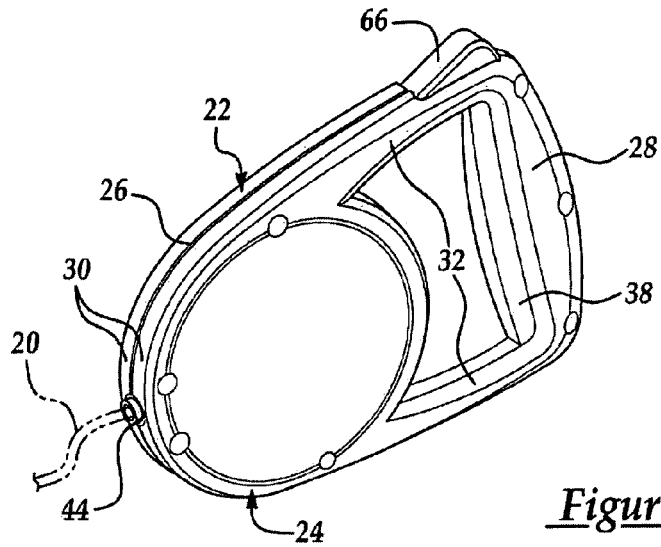
FIG. 1 is a perspective view of a preferred embodiment of the subject invention.
Figure 2:
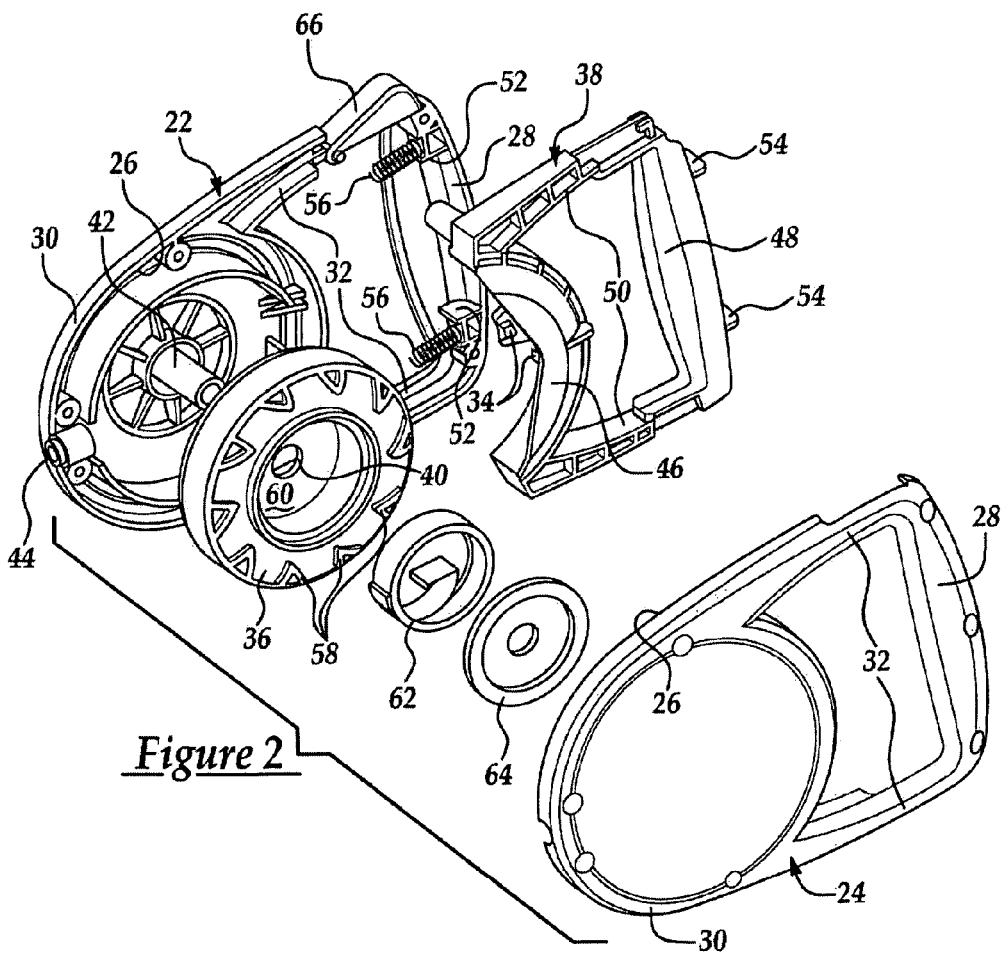
FIG. 2 is an exploded perspective view of the assembly shown in FIG. 1.
Figure 3:
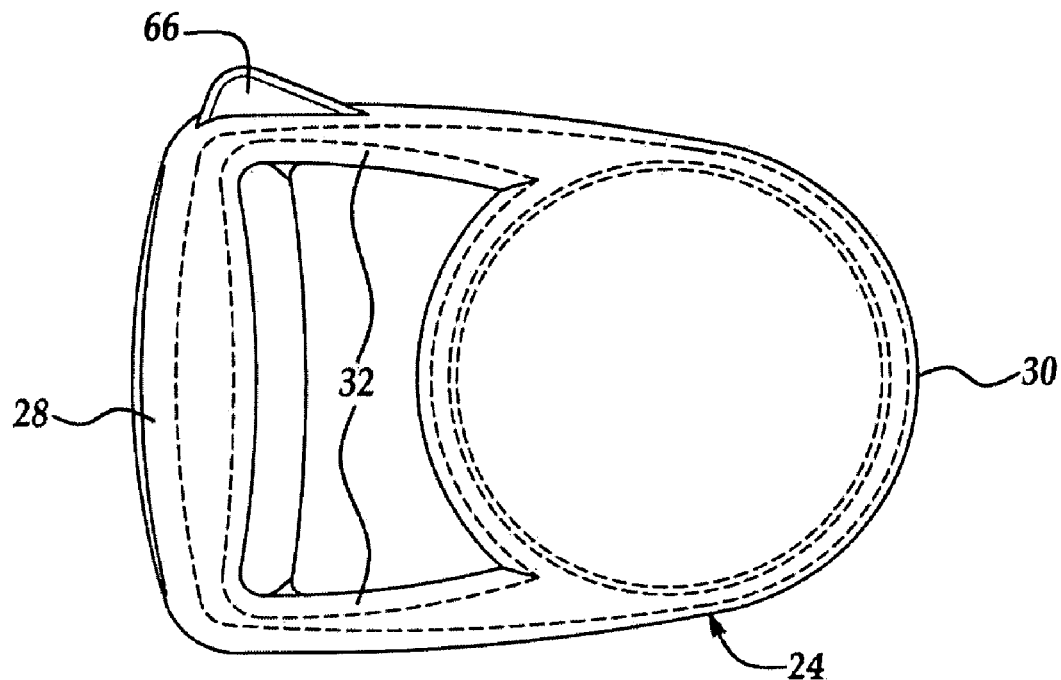
FIG. 3 is a side view of the outside of the cover of the housing of the assembly of FIG. 1.
Figure 4:
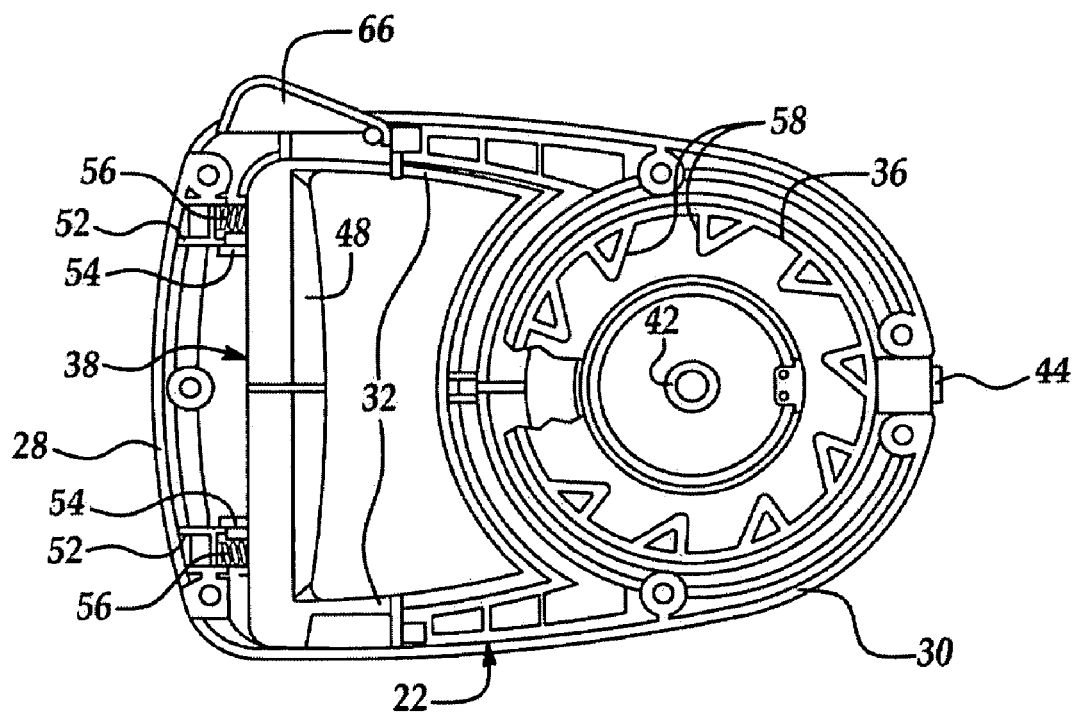
FIG. 4 is a side view of the interior of the base of the housing of the assembly of FIG. 1.

A retracting and locking leash assembly is shown in total in FIGS. 1 and 2. The assembly includes a housing comprising a base 22 and a cover 24 mating along an interface 26 extending through a handle 28 and a casing 30. In other words, the housing has two halves defined by a base 22 and a cover 24 that when mated together along the interface 26, define a cavity casing 30 and a handle 28 spaced from the cavity casing 30 by connectors 32 surrounding and defining an opening, such as a finger opening.

In addition, a spool 36 and a trigger 38 are disposed between the base 22 and the cover 24. The spool 36 is supported in the cavity casing 30 for rotation about a winding axis. More specifically, the spool 36 defines a bore 40 on the winding axis and the base 22 presents a shaft 42 extending into the bore 40 for rotatably supporting the spool 36 in the cavity casing 30 of the housing.

A leash 20 is attached to the spool 36 for winding and unwinding from the spool 36 in response to rotation of the spool 36. The leash 20 winds and unwinds about the circumference of the spool 36. In addition, the base 22 includes an eyelet 44 and the leash 20 travels through the eyelet 44 as it winds and unwinds about the spool 36.

The trigger 38 is slidably supported by the housing for rectilinear movement between a locked position to prevent rotation of the spool 36 and an unlocked position to allow rotation of the spool 36 to wind and unwind the leash 20. The trigger 38 includes a locking portion 46 disposed in the cavity casing 30 for engaging the spool 36 and a gripping portion 48 extending from the handle 28 into the opening for moving the trigger 38 rectilinearly. The trigger 38 also includes a pair of arms 50 coextensive with the connectors 32 about the opening and interconnecting the gripping portion 48 and the locking portion 46. The housing also presents a semi-circular periphery that extends through the opening and the locking portion 46 of the trigger 38 is circular and extends about the spool 36 within the housing.

The trigger 38 also includes a guide 52 and a tab 54 interconnecting the trigger 38 and the housing with the tab 54 slidably supported by the guide 52. More specifically, the gripping portion 48 is co-extensive with the handle 28 and includes a pair of guides 52 and a pair of tabs 54 spaced from one another along the handle 28 with each guide 52 paired with one of said tabs 54 for slidably supporting the gripping portion 48 at spaced positions on the handle 28. The pairs of guides 52 and tabs 54 align the trigger 38 such that the trigger 38 slides rectilinearly without tilting.

The assembly also includes a biasing device disposed between the handle 28 and the gripping portion 48 for biasing the trigger 38 toward an unlocked position. More specifically, the biasing device includes a spring 56 adjacent each paired guide 52 and tab 54 and the springs 56 react between the base 22 and the trigger 38.

The spool 36 includes a plurality of teeth 58 disposed in a circle about an axis of rotation of the spool 36 and the locking portion 46 includes a finger 34 for engaging the teeth 58 in the locked position. The finger 34 is disposed radially inside the circle of teeth 58 in the unlocked position and moves radially outwardly upon rectilinear movement of said gripping portion 48.

The spool 36 also includes a recess 60 surrounding the bore 40 and includes a torsion spring 62 disposed in the recess 60 and interconnecting the spool 36 and the shaft 42. The torsion spring 62 urges the spool 36 to rotate to wind the leash 20. The spool 36 also includes a cap 64 disposed over the recess 60 to enclose the torsion spring 62 within the recess 60.

The assembly also includes a stop 66 for selectively maintaining the trigger 38 in the locked position. The stop 66 is pivotally disposed on the assembly and includes a spring (not shown) to bias the stop 66 in the unlocked position. The spring for the stop 66 may be of any suitable design as known to those skilled in the art. When the trigger 38 is in the locked position, the stop 66 is squeezed to compress the spring and the stop 66 engages with the trigger 38 to maintain the trigger 38 in the locked position.

The base 22 and the cover 24 can be mated using a variety of connections including screws, sonic welding, or heat staking.

Obviously, many modifications and variations of the present invention are possible in light of the above teachings. The invention may be practiced otherwise than as specifically described within the scope of the appended claims, The reference numerals in the claims are merely for convenience and are not to be read in any way as limiting.

What is claimed is:

1. A retracting and locking leash assembly comprising;
   a housing defining a cavity casing (30) and a handle (28) spaced from said cavity casing (30) by connectors (32) surrounding and defining an opening,
   a spool (36) supported in said cavity casing (30) for rotation about a winding axis,
   a leash (20) attached to said spool (36) for winding on and unwinding from said spool (36) in response to rotation of said spool (36),
   a trigger (38) slidably supported by said housing for rectilinear movement between a locked position to prevent rotation of said spool (36) and an unlocked position to allow rotation of said spool (36) to wind and unwind said leash (20), and
   said trigger (38) having a locking portion (46) disposed in said cavity casing (30) and a gripping portion (48) co-extensive with said handle (28) and extending from said handle (28) into said opening with said gripping portion (48) of said trigger (38) being movable rectilinearly away from said spool (36) from said unlocked position outwardly toward said locked position for moving said locking portion (46) into engagement with said spool (36).

2. An assembly as set forth in claim 1 including at least one guide (52) and one tab (54) interconnecting said trigger (38) and said housing with said tab (54) slidably supported by said guide (52).

3. An assembly as set forth in claim 2 including a pair of said guides (52) and a pair of said tabs (54) spaced from one another along said handle (28) with each guide (52) paired with one of said tabs (54) for slidably supporting said gripping portion (48) at spaced positions on said handle (28).

4. An assembly as set forth in claim 1 wherein said trigger (38) includes a pair of arms (50) co-extensive with said connectors (32) about said opening and interconnecting said gripping portion (48) and said locking portion (46).

5. An assembly as set forth in claim 1 including at least one biasing device disposed between said handle (28) and said gripping portion (48) for biasing said trigger (38) toward said unlocked position.

6. An assembly as set forth in claim 5 wherein said biasing device includes a spring (56).

7. An assembly as set forth in claim 1 wherein said spool (36) includes a plurality of teeth (58) disposed in a circle about an axis of rotation of said spool (36) and said locking portion (46) includes a finger (34) for engaging said teeth (58) in said locked position.

8. An assembly as set forth in claim 7 wherein said finger (34) is disposed radially inside said circle of teeth (58) in said unlocked position and moves radially outward toward said locked position upon said rectilinear movement of said gripping portion (48).

9. An assembly as set forth in claim 1 wherein said housing includes a base (22) and a cover (24) mating along an interface (26) extending through said handle (28) and casing (30) and said spool (36), said trigger (38) being disposed between said base (22) and said cover (24).

10. An assembly as set forth in claim 9 wherein said housing presents a circular periphery that extends through said opening and said locking portion (46) of said trigger (38) is circular and extends about said spool (36) within said housing.

11. An assembly as set forth in claim 1 wherein said spool (36) defines a bore (40) on said winding axis and said base (22) presents a shaft (42) extending into said bore (40).

12. An assembly as set forth in claim 9 including at least one biasing device disposed between said handle (28) and said gripping portion (48) for biasing said trigger (38) toward said unlocked position with said biasing device reacting between said base (22) and said trigger (38).

13. An assembly as set forth in claim 11 wherein said spool (36) includes a recess (60) surrounding said bore (40) and including a torsion spring (62) disposed in said recess (60) and interconnecting said spool (36) and said shaft (42) for urging said spool (36) to rotate to wind said leash (20).

14. An assembly as set forth in claim 13 including a cap (64) disposed over said recess (60).

15. An assembly as set forth in claim 1 including a stop (66) for selectively maintaining said trigger (38) in said locked position.

16. An assembly as set forth in claim 5 including a pair of guides (52) and a pair of tabs (54) spaced from one another along said handle (28) with each guide (52) paired with one of said tabs (54) for slidably supporting said gripping portion (48) at spaced positions on said handle (28) and wherein said biasing device includes a spring (56) adjacent each paired guide (52) and tab (54).

17. A retracting and locking leash assembly comprising;
   a housing defining a cavity casing (30) and a handle (28) spaced from said cavity casing (30),
   a spool (36) supported in said cavity casing (30) for rotation about a winding axis,
   a leash (20) attached to said spool (36) for winding on and unwinding from said spool (36) in response to rotation of said spool (36),
   a trigger (38) slidably supported by said housing for rectilinear movement between a locked position to prevent rotation of said spool (36) and an unlocked position to allow rotation of said spool (36) to wind and unwind said leash (20), and
   at least one biasing device reacting between said housing and said trigger (38) for continuously biasing said trigger (38) toward said spool (36) and into said unlocked position to allow said rotation of said spool (36) and for allowing said trigger (38) to move rectilinearly away from said spool (36) from said unlocked position outwardly toward said locked position to prevent said rotation of said spool (36);
   wherein said trigger (38) has a locking portion (46) disposed in said cavity casing (30) for engaging said spool (36) and a gripping portion (48) co-extensive with said handle (28) and extending from said handle (28) into an opening for moving said trigger (38) between said positions within said opening.

18. An assembly as set forth in claim 17 including a pair of guides (52) and a pair of tabs (54) spaced from one another along said handle (28) with each guide (52) paired with one of said tabs (54) for slidably supporting said gripping portion (48) at spaced positions on said handle (28) and wherein said biasing device includes a spring (56) adjacent each paired guide (52) and tab (54).

19. An assembly as set forth in claim 17 wherein said biasing device includes a spring (56).

* * * * *